Jan. 9, 1934.   M. P. BROWNE   1,942,998
MOUNTING FOR SLIDING VEHICLE SEATS
Filed March 5, 1932
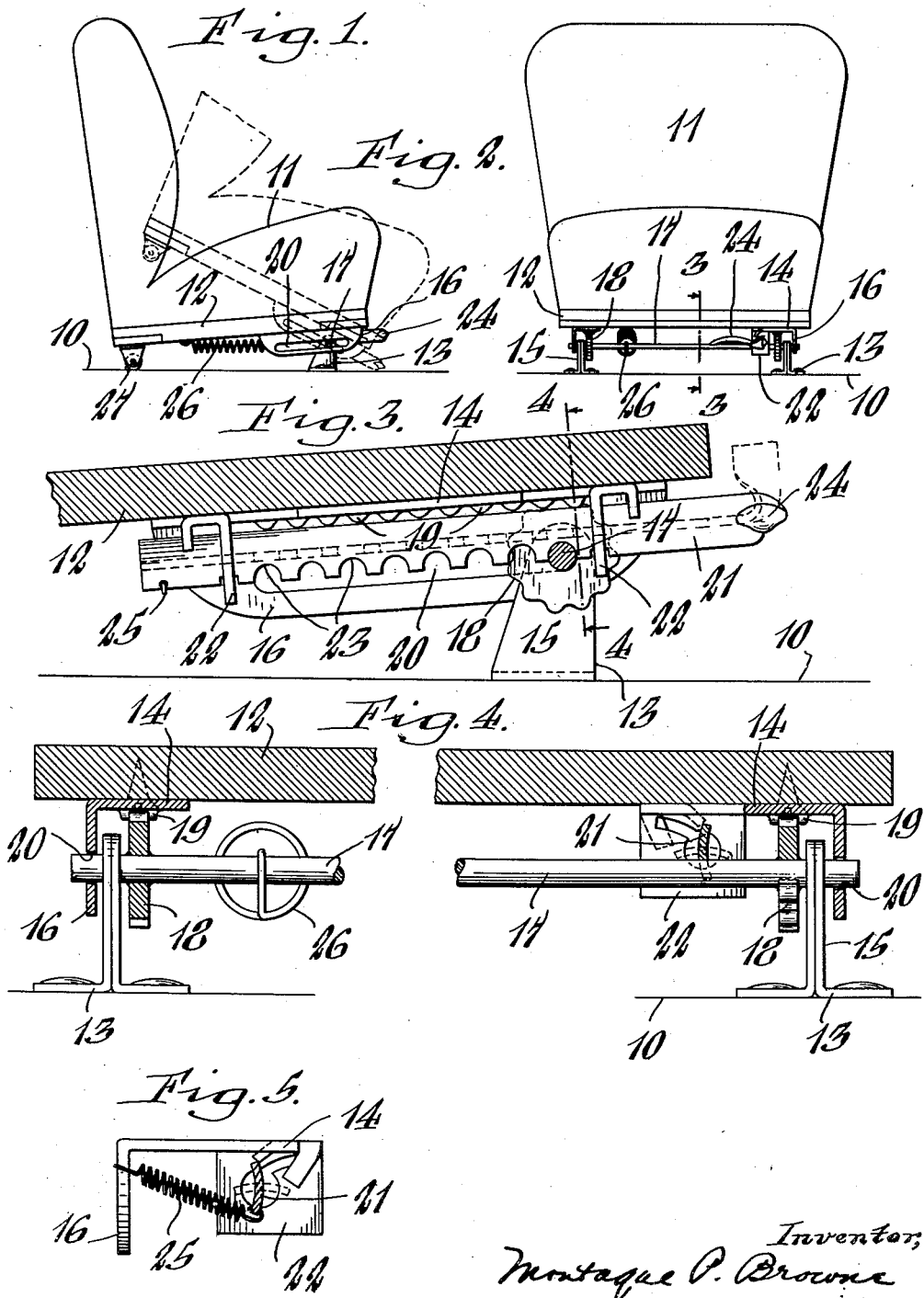

Patented Jan. 9, 1934

1,942,998

UNITED STATES PATENT OFFICE 1,942,998

MOUNTING FOR SLIDING VEHICLE SEATS

Montague P. Browne, Buffalo, N. Y.

Application March 5, 1932. Serial No. 597,002

11 Claims. (Cl. 155—14)

This invention relates to improvements in mountings for vehicle seats and more particularly to a mounting for sliding automobile seats.

It has for its object to provide a mounting of this character which is so designed and constructed as to insure the fore and aft movements of the seat in a true and straight path.

Another object of the invention is to provide a mounting for sliding vehicle seats which is simple, compact and inexpensive in construction, which is so designed that its parts may be readily installed to the vehicle-floor and seat-frame, and which is provided with positive means for latching the seat in a desired adjusted position.

A further object is the provision of a sliding mounting of this character which is constructed to enable the seat to be tilted or swung to a forward position should it be desired to make additional room to facilitate the ingress and egress of passengers to and from the vehicle.

In the accompanying drawing:—Figure 1 is a side elevation of a vehicle seat showing my improved seat mounting associated therewith. Figure 2 is a front view thereof. Figure 3 is an enlarged fragmentary vertical longitudinal section taken in the plane of line 3—3, Figure 2. Figure 4 is an enlarged fragmentary transverse section taken in the plane of line 4—4, Figure 3. Figure 5 is a rear end view of one of the seat brackets and the latch member associated therewith.

Similar characters of reference indicate corresponding parts throughout the several views.

Referring now to the drawing, 10 indicates the floor of an automobile and 11 the front seat thereof having the customary base frame 12. At its opposite sides the seat-frame is slidingly supported to move lengthwise of the vehicle, whereby the seat may be adjusted to suit the comfort and convenience of the driver in operating the car or to facilitate the ingress and egress of passengers to and from the rear seat of the vehicle.

Mounted on the floor and seat-frame for relative longitudinal movement and disposed adjacent to the opposite sides of the seat are two sets or pairs of plates or brackets 13 and 14, respectively, the set of brackets or base plates 13 being bolted or otherwise secured to the floor and being provided with substantially upright flanges 15. The seat-brackets 14 are mounted on the underside of the front portion of the seat-frame 12 by bolts or other appropriate fasteners and are provided with depending flanges 16 which partially overlie the companion flanges of the floor-brackets, in the manner shown in Figures 2 and 4. Extending crosswise of the vehicle beneath the seat frame is a horizontal shaft 17 supported and journaled at its ends in the upright flanges 15 of the floor brackets 13. Fixed adjacent the ends on this shaft are gears or toothed wheels 18 which engage corresponding rack-bars 19 formed in the attaching portions of the seat brackets 14, so that as the seat is shifted fore and aft, this rack and gear construction positively guides the seat in a uniformly straight path. The ends of the shaft 17 preferably extend outwardly beyond the floor-bracket 13, as seen in Figure 4, and engage longitudinal slots or guide ways 20 formed in the depending flanges 16 of the seat brackets, whereby the seat is free to move lengthwise relative to the shaft and at the same time held against vertical displacement.

Any suitable means may be employed for the purpose of adjusting and latching the seat in any one of a plurality of positions. By way of example, I have shown a controlling element consisting of a latch-bar 21 rotatably supported adjacent its ends in bearing flanges 22 depending from the front and rear ends of one of the seat-brackets 14. In one of its longitudinal edges, this latch-bar is provided with a row of locking notches 23 which are adapted to releasably interlock with the shaft 17, which constitutes a keeper element, and thereby prevent rotation of the gear wheels 18 to effectually latch the seat against endwise movement. At its front end the latch bar terminates in a handle 24 which may be disposed adjacent the front end of the seat where it can be conveniently manipulated by the driver of the vehicle. A spring 25 normally serves to retain the latch bar in interlocking engagement with the shaft, and when it is desired to release the latch bar, its handle is swung upwardly to shift the same to the position shown by dotted lines in Figure 4, in which position the seat is free to be shifted fore or aft. When the desired position has been reached, the handle is released and the latch bar is then automatically swung to the corresponding latched position seen in Figure 2.

To facilitate the forward gliding movement of the seat, I preferably employ an energy-storing element, which may consist of a spring 26 connected at one end to the seat-frame 12 and at its other end to the shaft 17 or other fixed part.

In the embodiment of the invention herein shown, the seat 11 is of the type which may be swung or tilted forwardly, the shaft 17 constituting a pivot for this purpose. At its rear end the seat may be provided with supporting feet or rollers 27.

I claim as my invention:

1. A mounting for sliding automobile seats, comprising a set of bracket members adapted for attachment to the seat, a second set of bracket members adapted for attachment to the floor of the vehicle, one set of bracket members including an attaching base having gear racks thereon disposed in the direction of sliding of the seat and a flange depending from said base and having correspondingly extending guide ways therein, and a shaft journaled in the other set of bracket members and extending through said guideways for relative longitudinal movement therein and having toothed wheels thereon engageable with the racks of the companion bracket members.

2. A mounting for sliding automobile seats, comprising bracket members adapted for attachment to the seat and floor of the vehicle, respectively, one set of bracket members having gear racks thereon, disposed in the direction of sliding of the seat, a shaft journaled in the other set of bracket members and having toothed wheels thereon engageable with the racks of the companion members, and means for latching the toothed wheels and racks against relative movement, said means including a rotatable element disposed lengthwise of the seat and supported at its ends in the seat-bearing bracket members.

3. A mounting for sliding automobile seats, comprising bracket members adapted for attachment to the seat and floor of the vehicle, respectively, one set of bracket members including an attaching base having gear racks thereon disposed in the direction of sliding of the seat, a combined shaft and keeper element journaled in the other set of bracket members and having toothed wheels thereon engageable with the racks of the companion members, the rack-bearing bracket members having flanges adjacent its ends, and means supported on said flanges for releasably engaging said shaft and latching the same and its toothed wheels against rotary and longitudinal movement relative to said gear racks.

4. A mounting for sliding automobile seats, comprising bracket members adapted for attachment to the seat and floor of the vehicle, respectively, one set of bracket members having gear racks thereon disposed in the direction of sliding of the seat, a combined shaft and keeper element journaled in the other set of bracket members and having toothed wheels thereon engageable with the racks of the companion members, one set of bracket members having bearing elements thereon spaced in the direction of length of the seat, and a latch bar revolvably mounted in said bearing elements for releasable engagement with said shaft to hold the seat in a desired set position.

5. A mounting for sliding automobile seats, comprising bracket members adapted for attachment to the seat and floor of the vehicle, respectively, one set of bracket members having gear racks thereon disposed in the direction of sliding of the seat, a shaft journaled in the other set of bracket members and having toothed wheels thereon engageable with the racks of the companion members, and a latch bar having notches therein applied to one of said bracket members for releasable engagement with said shaft to hold the toothed wheels and racks against relative movement, whereby the seat is held in a desired set position.

6. A mounting for sliding automobile seats, comprising a set of brackets adapted for attachment to the floor of the vehicle, a shaft journaled at its ends in said brackets and having gear wheels thereon, a second set of brackets adapted for attachment to the seat having gear racks thereon engageable with said gear wheels and having guideways therein for said shaft whereby relative movement of the respective brackets is permitted, one of said seat-brackets having bearing elements thereon, and a latch bar revolvably mounted in said bearing elements for releasable engagement with said shaft to hold the seat in a desired set position.

7. A mounting for sliding automobile seats, comprising a set of brackets adapted for attachment to the floor of the vehicle, a shaft journaled at its ends in said brackets and having gear wheels thereon, a second set of brackets adapted for attachment to the seat having gear racks thereon engageable with said gear wheels and having guideways therein for said shaft whereby relative movement of the respective brackets is permitted, one of said seat-brackets having bearing elements thereon, and a latch bar disposed at right angles to said shaft and rotatably mounted in said bearing elements, said bar being provided in one of its longitudinal edges with a series of notches one or another of which is adapted to engage the shaft to latch the seat in a set position.

8. A mounting for sliding automobile seats, comprising a set of brackets adapted for attachment to the floor of the vehicle, a shaft journaled at its ends in said brackets and having gear wheels thereon, a second set of brackets adapted for attachment to the seat and each including a horizontal flange containing a gear rack engageable with the companion shaft-gear and an upright flange having a longitudinal slot therein through which said shaft extends, said horizontal flange having depending bearing elements at its ends, and a latch bar revolvably mounted in said bearing elements for releasable engagement with said shaft to hold the seat in a desired set position.

9. A seat mounting of the character described, comprising a set of floor-brackets, a shaft journaled at its ends in said brackets and having toothed wheels thereon, a set of seat-brackets having attaching flanges and depending flanges, the latter having longitudinal slots therein through which the ends of said shaft extend to permit relative longitudinal movement of the seat, said shaft-ends constituting pivots about which the seat may be swung to an abnormal position, gear racks applied to the attaching flanges of said seat-brackets and with which said toothed wheels are adapted to engage, and means for releasably latching the toothed wheels against movement relative to the companion gear racks.

10. A mounting for sliding automobile seats, comprising bracket members adapted for attachment to the seat and floor of the vehicle, respectively, one set of bracket members having gear racks thereon disposed in the direction of sliding of the seat, toothed wheels rotatably mounted on the other set of bracket members and engageable with the racks of the companion members, a keeper element applied to said last-named bracket members, the first set of bracket members having bearing elements thereon spaced in the direction of length of the seat, and a rotatable latch bar disposed lengthwise of the seat and journaled adjacent its ends in said bearing elements for releasably engaging said keeper element and latching said toothed wheels against movement relative to said racks, said latch bar being provided with a longitudinal row of latching element for holding the seat in longitudinally adjusted positions and having an actuating handle at its front end.

11. A seat mounting of the character described, comprising a set of bracket members adapted for attachment to the seat, a second set of bracket members adapted for attachment to a fixed support, one set of bracket members having gear racks thereon disposed in the direction of sliding of the seat, toothed wheels on the other set of bracket members engageable with said gear racks, means including a shaft and a slot providing a longitudinal sliding connection between the companion bracket members but preventing relative vertical displacement thereof, said shaft supporting said toothed wheels in axial alinement on their corresponding bracket members and constituting a pivot about which the seat may be tilted to an abnormal position, and a latch bar revolvably mounted on the seat bracket members for releasable engagement with said shaft to hold the seat in an adjusted set position.

MONTAGUE P. BROWNE.